April 5, 1949.
L. W. YOUNG
2,466,143
VIBRATORY TRACTION DRIVE FOR BLOWPIPE
PROPELLING MACHINES
Filed Aug. 25, 1943
2 Sheets-Sheet 1
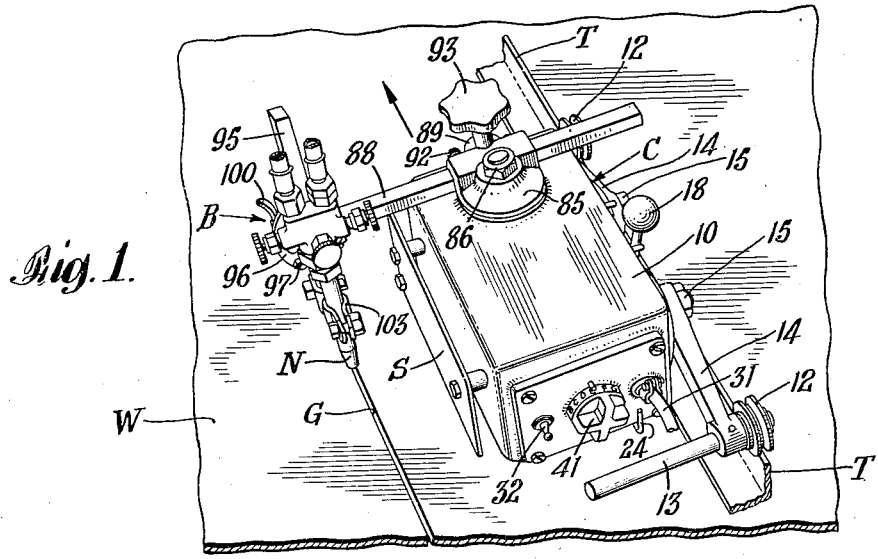
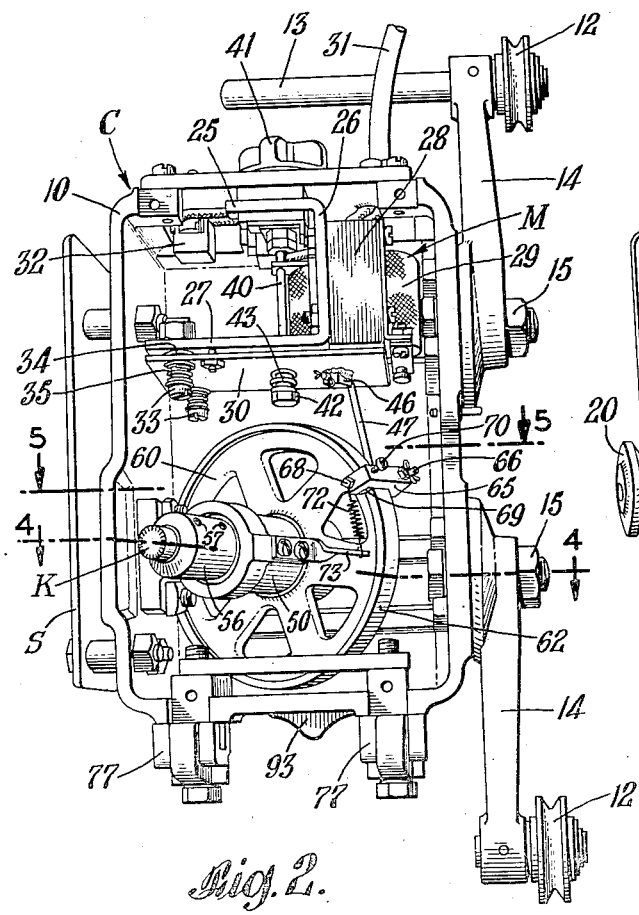
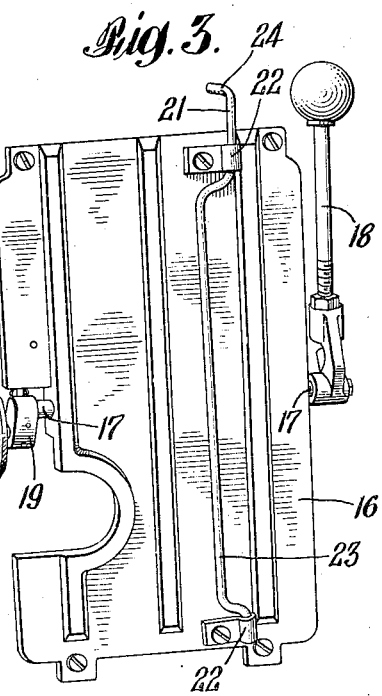
INVENTOR
LLOYD W. YOUNG
BY
Ed Greenewald
ATTORNEY

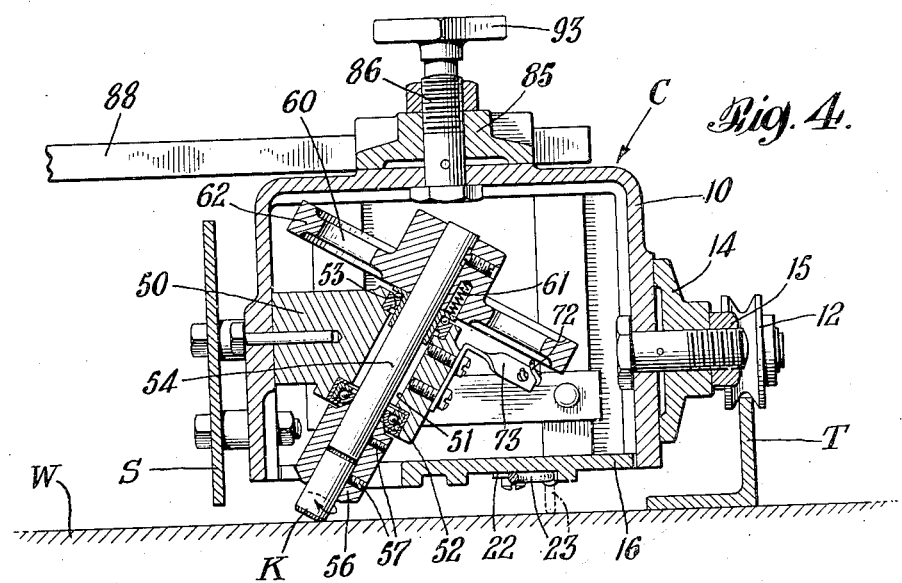
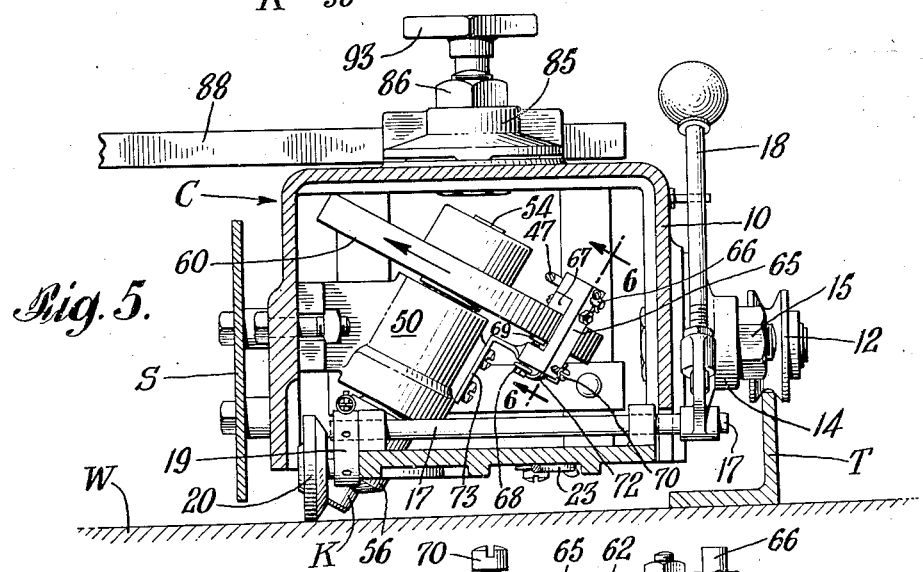
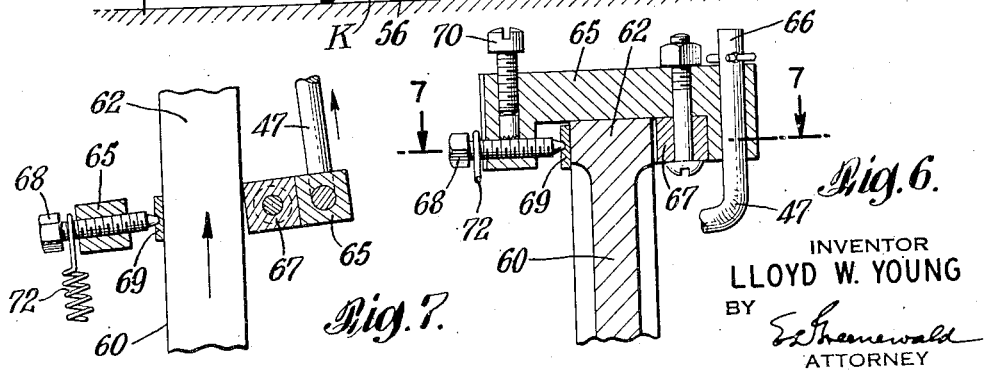

Patented Apr. 5, 1949

2,466,143

UNITED STATES PATENT OFFICE 2,466,143

VIBRATORY TRACTION DRIVE FOR BLOWPIPE PROPELLING MACHINES

Lloyd W. Young, Elizabeth, N. J., assignor to Union Carbide and Carbon Corporation, a corporation of New York Application August 25, 1943, Serial No. 499,934

13 Claims. (Cl. 266—23)

This invention relates to a vibratory traction drive for tool propelling machines, and more particularly to a variable speed reversible traction drive for portable machines of this character for propelling blowpipes or other tools or devices, whether oxyfuel or electric, for cutting, welding, desurfacing, deseaming, descaling or other thermal metal treating operations.

While there are special cutting or welding machine for various purposes and of more or less adaptability, the cost of these machines is often prohibitive, particularly for small shops having a limited or varying quantity of work to be done, which would justify the use of a propelling machine.

It is therefore the principal object of the present invention to simplify the construction and operation of portable tool propelling machines, and thereby enable the same to be produced at low cost.

Variable speed portable machines of the type ordinarily employed for supporting and propelling cutting or welding blowpipes are usually powered by a standard electric motor. The angular velocity of these motors being relatively high, requires the use of a speed reducing machine interposed between the motor and the drive wheels of the apparatus. In addition, suitable clutching means must be employed also, in order that the entire gear train or a portion thereof may be disengaged from the drive wheels.

Other objects of this invention therefore are to avoid the disadvantages of such standard electric motor and speed reducing means, and to provide a vibratory traction drive for tool propelling machines in which the vibratory motion is converted to rotary motion having an angular velocity within that range required for direct coupling the rotor to the driving wheel of the machine, and to provide means for varying the speed within that range.

Another object of the invention is to provide an electrical starting switch and reversible transmission for such machines wherein the starting switch is operated by the shift lever; the said electrical switch being turned off when the shift lever is in the neutral position, and turned on when the shift lever is in either the forward position or the reverse position.

The vibratory traction drive according to the present invention comprises a vibratory reed or armature which may be vibrated by electrical, mechanical or fluid pressure power. The vibration is transmitted, preferably by a link, to a gripper associated with the rim of a driving wheel. The rim is preferably received in a notch in the gripper and the driving stroke causes the gripper to first incline with respect to the rim, and bind or clamp the rim and then rotate the wheel through an incremental angle. With higher frequencies of vibration, the cumulative incremental angles result in continuous rotation of the wheel at substantially uniform speed, the speed being controlled by the frequency or the amplitude of vibration.

On the return stroke of the vibratory member, the gripper releases the rim and idles therealong. Desirably a second similar gripper is provided to bind or clamp the rim on the return stroke of the first gripper, to prevent reverse rotation of the wheel; or the second gripper may be alternately driven for a positive driving stroke during the return stroke of the first, thus providing a push-pull or double-action drive.

By providing a relative large diameter of drive wheel, and a relatively small trunnion on the lower end of the drive shaft, and inclining the drive shaft to the vertical to engage the trunnion with the supporting surface, a direct drive is provided with speeds satisfactory for cutting and welding. Inclining the shaft also enables the drive wheel and shaft to be housed within a relatively small casing.

In the accompanying drawings:

Fig. 1 is a perspective view of a cutting machine according to the preferred embodiment of the present invention;

Fig. 2 is a perspective view of the underside of the machine, with the cover removed;

Fig. 3 is a perspective view of the bottom cover plate for Fig. 2;

Fig. 4 is a section taken along the line 4—4 of Fig. 2;

Fig. 5 is a section taken along the line 5—5 of Fig. 2;

Fig. 6 is a section taken along the line 6—6 of Fig. 5; and

Fig. 7 is a section taken along the line 7—7 of Fig. 6.

The cutting or welding machine according to the preferred embodiment of the present invention as shown in Fig. 1, has a carriage C comprising a box-like casing 10, for example a hollow casting open at the bottom, which forms the frame or chassis for the entire machine. The carriage C is supported on or guided by a track T, which is engaged by rollers 12 journalled on axles 13, carried by arms 14 angularly adjustably secured to the casing 10 by bolts 15.

Within the casing 10 is mounted a vibratory motor M which transmits power for driving a knurled trunnion K. The carriage C supports a blowpipe B having a nozzle N adapted to cut a kerf G in the work W, a shield S being interposed between the nozzle N and the carriage C, to protect the carriage from the heat of the blowpipe B.

The casing 10 is closed by a cover 16 shown in Fig. 3. A shaft 17 is journaled transversely in the cover, and is turned by a lever 18 secured to one end of the shaft and extending therefrom upwardly alongside the casing. The other end of the shaft has a crank arm 19 carrying an axle for a supporting roller 20, which as shown in Fig. 5, raises the trunnion K clear of driving engagement with the supporting surface of the work W.

The cover 10 also rotatably supports a shaft 21 journaled for example in clips 22 secured to the underside of the cover, and comprises a bight 23 between the clips, and terminating in an angularly disposed operating lever or crank portion 24.

As shown in Fig. 4, the lever 24 may be turned to bring the bight 23 into supporting position engaging the work W, so that the entire machine is supported on the bight 23 and the trunnion K. This provision facilitates the adjustment of the arms 15 to raise or lower the rollers 12 for engagement with different heights of track T.

The vibratory motor M is mounted inside of one end of the casing, and comprises a channel shaped frame having a leg 25 rigidly secured to the casing, a bridge portion 26, and a longer leg 27. The bridge portion 26 carries a magnet comprising laminated core 28 and a coil 29. Current is supplied to the coil 29 by a lead in wire 31 and controlled by a switch 32. The leg 27 carries an armature 30 in position to be vibrated by the magnet. The outer end of the leg 27 carries a pair of bolts 33 which pass through registering holes in the armature 30. Washers 34 are interposed between the leg 27 and the armature 30, and coil compression springs 35 are interposed between the armature and the heads of the bolts 32.

A speed adjustment shaft 40 passes through the casing and the legs 25 and 27, being suitably journaled therein. Threaded on outer end of this shaft 40 is an operating knob 41, and the inner end carries an adjustment screw 42 with a spring 43 thereunder engaging the armature 30. A lug 46 on the armature 30 pivotally receives an angularly disposed end of a driving link 47.

Referring to Figs. 2, 4, and 5, a bearing block 50 is secured to one side of the casing 10 near the opposite end, and is provided with a bore 51 and antifriction bearings 52 and 53 which journal a drive shaft 54 in the bore. The drive shaft 54 is inclined to the vertical in a transverse plane, and its lower end terminates in a knurled drive trunnion K. In the form shown the trunnion K is knurled at each end and reversibly secured to the shaft by a sleeve 56 and set screws 57. The upper end of the shaft 54 has keyed thereto a drive wheel 60. A spring 61 in a bore in the hub of the drive wheel bears on a race of the ball bearings 53 to take up any axial play of the shaft.

For translating the vibrations of the driving link 47 into rotary impulses to the rim of the drive wheel 60, a gripper 65 is provided, which is shown in detail in Figs. 6 and 7. The outer end 66 of the drive link 47 is angularly disposed radial to the axis of the drive shaft 54, and is received in a bore in one end of the gripper 65. A wear block 67 is secured to the gripper in position to bear on the upper side of the rim 62. The opposite end of the gripper carries a screw 68 which holds a friction shoe 69 against the underside of the rim 62. A locking screw 70 holds the screw 68 in adjusted position. A coiled tension spring 72 extends from the gripper 65, secured for example to the screw 68, to a bracket 73 secured to the bearing block 50.

In operation, when the switch 32 is turned on, current from the line 31 energizes the coil 29, causing the magnet to vibrate the armature 30. The vibrations of the armature are transmitted by the link 47 to the upper end of gripper 65. On the repulsion stroke, the wear block 67 merely slides along the side of the rim 62; but on the traction stroke as shown in Fig. 7, the spring 72 opposes return of the lower end of the gripper, causing canting of the gripper and clamping of the rim 62 between the wear block 67 and the friction shoe 69, thus moving the rim 62 a small amount for each cycle of vibration which, at suitable frequency, results in rotation of the rim 62 at substantially uniform speed.

The rotation of the rim 62 results in rotation of the trunnion K at the same angular speed, but the smaller diameter of the trunnion K results in decreased linear speed of rolling contact with the work W. The speed may be varied by turning the knob 41, which increases or decreases the amplitude vibration of armature 30 so that with constant frequency the resultant speed is increased or decreased.

What is claimed is:

1. In a self-propelled thermal metal-treating tool carrying machine having a rotary traction member, a drive wheel of larger diameter than said traction member and rigid therewith, means for journaling said drive wheel and traction member on an axis inclined to the supporting surface in a plane transverse to the direction of movement of the machine with the large drive wheel toward the top and the small traction member at the bottom, a vibratory member, and means engaging the rim of said drive wheel for driving said drive wheel from said vibratory member and thereby driving said rotary traction member at thermal metal treating speed.

2. In a self-propelled thermal metal-treating tool-carrying machine having a rotary traction member, a drive wheel of larger diameter than said traction member and rigid therewith, means for journaling said drive wheel and traction member on an axis inclined to the supporting surface in a plane transverse to the direction of movement of the machine with the large drive wheel toward the top and the small traction member toward the bottom, an electromagnet having a vibratory armature, and means engaging the rim of said drive wheel for driving said rotary traction member from said vibratory armature at thermal metal-treating speed.

3. In a self-propelled thermal metal-treating tool-carrying machine having a rotary traction member, a drive wheel of larger diameter than said traction member, said wheel and member being fixed in spaced relation on a common shaft having an axis inclined to the supporting surface in a plane transverse to the direction of movement of the machine with the large drive wheel toward the top and the small traction member toward the bottom, a vibratory member and an intermittent grip transmission engaging the rim of said drive wheel for driving said rotary traction member from said vibratory member at thermal metal treating speed.

4. In a thermal metal-treating tool-propelling machine having a single rotary traction member adapted to engage the supporting surface for propelling the machine, a drive wheel of larger diameter than said traction member and rigid therewith, means for journaling said drive wheel and traction member on an axis inclined to the supporting surface in a plane transverse to the direction of movement of the machine with the large drive wheel at the top and the small traction member at the bottom, a vibratory member and means engaging the rim of said drive wheel for driving said single rotary traction member from said vibratory member at thermal metal-treating speed.

5. In a self-propelled thermal metal-treating tool-carrying machine having a casing, a rotary traction member and a drive wheel therefor of larger diameter than said traction member and rigid therewith, means for journaling said drive wheel and traction member in said casing on an axis inclined to the supporting surface in a plane transverse to the direction of movement of the machine with said drive wheel toward the top and said traction member projecting below said casing, a vibratory member and an intermittent grip transmission engaging the rim of said drive wheel for driving said rotary traction member from said vibratory member at thermal metal-treating speed.

6. In a self-propelled thermal metal-treating tool-carrying machine having a casing, a rotary traction member and a drive wheel therefor of larger diameter than said traction member and rigid therewith, a bearing mounted on one side of said casing for journaling said drive wheel and traction member on an axis inclined to the supporting surface in a plane transverse to the direction of movement of the machine with the drive wheel at the top and the traction member projecting below said casing, an electromagnet having a vibratory armature and mounted in one end of said casing, and an intermittent grip transmission mechanism engaging the rim of said drive wheel at a point within said casing opposite the mounting of said bearing and connected to said vibratory armature for driving said rotary traction member therefrom at thermal metal-treating speed.

7. In a reversible self-propelled thermal metal-treating tool-carrying machine having a rotary traction member, a drive wheel of larger diameter than said traction member and rigid therewith, means for journaling said drive wheel and traction member on an axis inclined to the supporting surface in a plane transverse to the path of movement of the machine with the drive wheel toward the top and the traction member at the bottom, a vibratory member, an intermittent spring grip transmission engaging the rim of said drive wheel and connected to said vibratory member for driving said rotary traction member at metal treating speed, and means for changing the spring bias of said transmission to reverse the direction of rotation of said traction member.

8. In a self-propelled tool-carrying machine for thermal metal-treating operation and having a casing, a rotary traction member, a drive wheel of larger diameter than said traction member and rigid therewith, a bearing mounted on one side of the casing for journaling said drive wheel and traction member on an axis inclined to the supporting surface in a plane transverse to the direction of movement of the machine with the drive wheel toward the top and the traction member projecting below said casing, an electromagnet having a vibratory armature, a link pivoted at one end to said armature, an intermittent drive gripper pivoted to the other end of said link and having a slot receiving the rim of said drive wheel at a point within said casing opposite the mounting of said bearing for driving said rotary traction member from said vibratory armature at metal-treating speed.

9. In a variable speed self-propelled thermal metal-treating tool-carrying machine having a rotary traction member, a drive wheel of larger diameter than said traction member and rigid therewith, means for journaling said drive wheel and traction member on an axis inclined to the supporting surface in a plane transverse to the direction of movement of the machine with the drive wheel toward the top and the rotary traction member at the bottom, an electromagnet having a vibratory armature, means engaging the rim of said drive wheel for driving said rotary traction member from said vibratory armature at thermal metal treating speed, and means for adjusting the amplitude of vibration of said armature to vary the thermal metal treating speed of said rotary traction member.

10. In a self-propelled thermal metal-treating tool-carrying machine having a casing with a rotary traction member journaled therein, a drive wheel of larger diameter than said traction member and rigid therewith, a bearing removably secured to one side of said casing for journaling said drive wheel and traction member on an axis inclined to the supporting surface whereby said bearing, traction member and drive wheel may be removed as a unit, a portable plate secured to said casing, an electric vibrator mounted on said portable plate and removable therewith, and disconnectible means connecting said vibrator with an intermittent grip transmission engaging the rim of said drive wheel for driving said rotary traction member at thermal metal-treating speed.

11. In a self-propelled thermal metal-treating tool-carrying machine having a rotary traction member, a drive wheel of larger diameter than said traction member and rigid therewith, means for journaling said drive wheel and said traction member on an axis inclined to the supporting surface, a vibratory member operated at high frequency, and means engaging the rim of said drive wheel and connected to said vibratory member for converting the vibrations into rotary motion having an angular velocity within the range required for direct coupling to said rotary traction member, whereby the cumulative incremental angles result in substantially continuous rotation at substantially uniform speed for driving said rotary traction member at thermal metal-treating speed.

12. In a self-propelled thermal metal-treating tool-carrying machine having a rotary traction member, a drive wheel of larger diameter than said rotary traction member and rigid therewith, a vibratory member, means for journaling said drive wheel and said rotary traction member on an axis inclined to the supporting surface, and means engaging the rim of said drive wheel for driving said inclined rotary traction member from said vibratory member at thermal metal-treating speed.

13. In a self-propelled thermal metal-treating tool-carrying machine having a casing with a rotary traction member therefor fixed on a drive shaft, a drive wheel of larger diameter than said traction member fixed on said shaft, means for journaling said drive shaft in said casing on an axis inclined to the supporting surface, a vibratory member, and means engaging the rim of said drive wheel for driving said rotary traction member from said vibratory member at thermal metal-treating speed.

LLOYD W. YOUNG.

REFERENCES CITED

The following references are of record in the file of this patent:

UNITED STATES PATENTS

| Number | Name | Date |
|---|---|---|
| Re. 16,892 | Ruckelshaus | Feb. 28, 1928 |
| 335,702 | Holt et al. | Feb. 9, 1886 |
| 508,206 | Coldwell | Nov. 7, 1893 |
| 543,597 | Dixon | July 30, 1895 |
| 578,888 | Martin | Mar. 16, 1897 |
| 641,390 | Hooper | Jan. 16, 1900 |
| 1,205,115 | Sidney | Nov. 14, 1916 |
| 1,243,182 | Keller et al. | Oct. 16, 1917 |
| 1,379,360 | Pickering | May 24, 1921 |
| 1,396,337 | McDonald | Nov. 8, 1921 |
| 1,553,508 | Cloud | Sept. 15, 1925 |
| 1,684,689 | Snyder | Sept. 18, 1928 |
| 1,823,194 | Gray | Sept. 15, 1931 |
| 1,830,539 | Hancock | Nov. 3, 1931 |
| 1,921,994 | Mladinich | Aug. 8, 1933 |
| 1,941,184 | Oldham | Dec. 26, 1933 |
| 2,040,478 | Glaum, Jr., et al. | May 12, 1936 |
| 2,053,890 | Anderson | Sept. 8, 1936 |
| 2,094,621 | Savage | Oct. 5, 1937 |
| 2,142,815 | Getz | Jan. 3, 1939 |
| 2,165,719 | Munnich et al. | July 11, 1939 |
| 2,173,794 | Von Radiis et al. | Sept. 19, 1939 |
| 2,185,781 | Becker | Jan. 2, 1940 |
| 2,265,668 | Miller | Dec. 9, 1941 |
| 2,274,875 | Thompson | Mar. 3, 1942 |
| 2,283,347 | Young | May 19, 1942 |
| 2,304,514 | Sutton | Dec. 8, 1942 |
| 2,311,223 | Geibig | Feb. 16, 1943 |
| 2,334,364 | Vavrick et al. | Nov. 16, 1943 |

FOREIGN PATENTS

| Number | Country | Date |
|---|---|---|
| 55,610 | Switzerland | Aug. 1, 1910 |
| 25,214 | Great Britain (1905) | Dec. 5, 1905 |
| 503,588 | Great Britain | Apr. 3, 1939 |

OTHER REFERENCES

Motor, page 31, August, 1938.